United States Patent [19]
Onishi et al.

[11] Patent Number: 6,074,440
[45] Date of Patent: Jun. 13, 2000

[54] MIXTURE OF DYES TO FORM A BLACK IMAGE

[75] Inventors: Akira Onishi; Tatsuo Tanaka; Mari Honda; Yoriko Nakayama, all of Hino, Japan

[73] Assignee: Konica Corporation, Tokyo, Japan

[21] Appl. No.: 08/974,981

[22] Filed: Nov. 20, 1997

[30] Foreign Application Priority Data

Nov. 21, 1996 [JP] Japan .................................. 8-310628

[51] Int. Cl.⁷ .................................................. C09B 23/00
[52] U.S. Cl. ........................................ 8/638; 8/690; 8/692
[58] Field of Search ................................ 8/638–643, 471

[56] References Cited

U.S. PATENT DOCUMENTS 5,503,956   4/1996   Kaszczuk et al. ...................... 430/200

*Primary Examiner*—Margaret Einsmann
*Attorney, Agent, or Firm*—Finnegan, Henderson, Farabow, Garrett & Dunner, L.L.P.

[57] ABSTRACT

The present invention relates to a mixture of dyes to form a black image. In particular, the present invention relates to a mixture that gives a black image having favorable stability to light and sufficient high density, and a thermal transfer recording material employing the mixture of dyes.

3 Claims, No Drawings

MIXTURE OF DYES TO FORM A BLACK IMAGE

The present invention relates to a mixture of dyes to form a black image. In particular, the present invention relates to a mixture that gives a black image having favorable stability to light and sufficient high density, and a thermal transfer recording material employing the mixture of dyes.

BACKGROUND OF THE INVENTION

Color image recording technology has been investigated using ink jet recording process, electrophotography, silver halide light sensitive material, thermal transfer recording process etc. for obtaining a color hard copy. Among these thermal transfer image forming method has an advantage of easy operation or maintenance, small size, low cost and so on.

For forming color image using the thermal transfer image forming material, each three color ink layer of yellow, magenta and cyan colors. In obtaining a black image by using the yellow, magenta and cyan color, they do not give a flat absorption for all visible light range and therefore they give low light absorption area between each of yellow, magenta and cyan color because the conventionally used color of yellow, magenta and cyan color have high chromaticness.

So, it is not easy to reproduce a pure black by mixing such three colors and it has been known to utilize the fourth black ink layer in addition to yellow, magenta and cyan ink layers.

As for two dyes having different colors is disclosed in Japanese Patent Open to Public Inspection (referred as Japanese Patent OPI) Nos. 5-185752 and 5-201147. The conventional black ink layer is so designed as to absorb at whole visible light area by making use of plural dyes having different absorption maximum. However, difference of color tone between the high density portion and low density portion is found since the thermal mobility caused by applied energy of each dyes is different in density and gradation change according to change of applied energy. Further difference of color tone between the high density portion and low density portion is found and it has been difficult to obtain a stable neutral gray because the durability against light irradiation of each dye is different.

It is necessary to incorporate dyes with high density to obtain a flat black in case that plural inks are used in a black image forming material. In these occasions, there are other problems that deterioration of recording material during storage such that the dye deposit during the storage or transportation of the recording materials, blocking occurred.

When a single dye has flat absorption for whole visible light range, the problem will be dissolved. However, it is not practically used because it has such disadvantages that the flat absorption is not obtain, high sensitivity is not obtain because of low solubility and low thermal mobility, desirable storability of the dye image is not obtained.

While dyes are important in the thermal transfer recording method, conventional dyes have such disadvantage of low image stability, low fixing ability or low storability against light.

A method for forming an ink layer by mixing two dyes having different colors is disclosed in Japanese Patent OPI Nos. 5-185752 and 5-201147. In this method it has such disadvantage of low image stability, low fixing ability or low storability against light because usual thermal diffusible dyes are used.

Improvement of the dyes in easy synthesis and good solubility in a solvent is desired for usage in ink.

SUMMARY OF THE INVENTION

The object of the invention is to provide a mixture of dyes for forming a black image having good storability such as durability against light. The other object is to provide a thermal transfer recording material forming a black image having good gradation at high image density and good fixing ability, and to provide a thermal transfer recording method using the recording material.

The invention and its embodiments are described.

Composition of mixture of dyes for forming black image comprising a yellow dye, a magenta dye and a cyan dye, wherein at least one of the dyes is a methine dye having a radical or a group of atoms that is capable of forming chelate bond in at least two positions.

The composition of mixture preferably comprises two methine dyes having a radical or a group of atoms that is capable of forming chelate bond in at least two positions.

The composition of mixture preferably comprises three methine dyes having a radical or a group of atoms that is capable of forming chelate bond in at least two positions.

The methine dye having a radical or a group of atoms that is capable of forming chelate bond in at least two positions is preferably a dye represented by formula (1) or (2).

(1)

(2)

In the formulas, $X_1$ and $X_2$ each represent a radical or a group of atoms that has 2 or more bonding positions capable of coordinate bond; $Y_1$ and $Y_2$ each represent a hydrocarbon ring or a heterocyclic group; $L_1$, $L_2$, $L_3$, $L_4$ and $L_5$ each represent a methine group which may be substituted; $n_1$ and $n_2$ each represented 0, 1 or 2.

The preferable example of $X_1$ and $X_2$ in the formula (1) and (2) is represented by the formula (3).

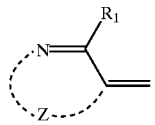

(3)

In the formula, Z is a atomic group forming a heterocyclic group containing a nitrogen atom which is capable of chelating. $R_1$ is a hydrogen atom or a monovalent substituent.

A dye providing material comprises an ink layer containing the composition of mixture of dyes mentioned above provided on a support.

A thermal transfer recording material is composed of a dye providing material containing the composition of mixture of dyes forming a black image mentioned above in an ink layer, and a image receiving material comprising an image receiving layer containing a compound comprising a metal ion.

A black image may be formed by a thermal transfer recording method comprising steps of superposing the dye providing material containing the composition of mixture of dyes forming a black image mentioned above in an ink layer on the image receiving material comprising an image receiving layer containing a compound comprising a metal ion, heating the superposed materials in accordance with image information from the dye providing material, whereby the dye transfers according to the image information to the image receiving layer to form black image by a reaction of the dye with the compound comprising a metal ion in the image receiving layer.

DETAILED DISCLOSURE OF THE INVENTION

In the present invention mixture of a yellow dye, a magenta dye and a cyan dye is used for forming black image, and at least one of the dyes is a methine dye having a radical or a group of atoms that is capable of forming chelate bond in at least two positions. Use of two or three methine dyes having a radical or a group of atoms that is capable of forming chelate bond in at least two positions is preferable. Two or more of each of a yellow dye, a magenta dye and cyan dye may be used in mixture. Another dye other than the yellow, magenta and cyan dyes may be used in addition to these dyes.

The methine dye represented by Formula (1) or (2) is preferably used. $X_1$ and $X_2$ in the Formula (1) or (2) is preferably represented by the Formula (3), and both of the atoms at the bonding positions of the methine dye are preferably nitrogen.

Example of the nitrogen containing heterocyclic ring group, which contains a radical or a group of atoms capable of forming chelate bond in at least two positions that is represented by $X_1$ and $X_2$ in Formula (1) or (2), includes, 5-pyrazolone, imidazole, pyrazolopyrrole, pyrazoloimidazole, pyrazolotriazole, pyrazolotetrazole, barbituric acid, thiobarbituric acid, rhodanine, hydantoine, thiohydantoine, oxazolone, isooxazolone, indanedione, pyrazolidinedione, oxazolidinedione, hydroxypyrridone, pyrazolopyrridone and pyrazolobenzimidazole.

The preferable $X_1$ and $X_2$ is the nitrogen containing hetero ring represented by formula (3), whose example includes 5-pyrazolone, imidazole, pyrazolopyrrole, pyrazoloimidazole, pyrazolotriazole, pyrazolotetrazole, isooxazolone and pyrazolobenzimidazole.

As $X_1$ and $X_2$ individually, those represented by the following Formulas (4) through (11) are specifically preferable.

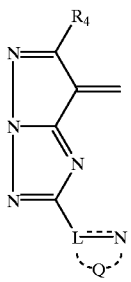

Formula (4)

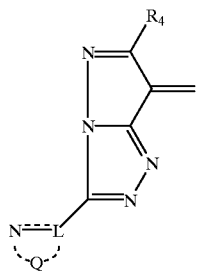

Formula (5)

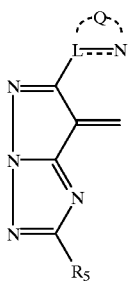

Formula (6)

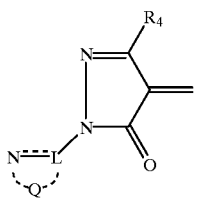

Formula (7)

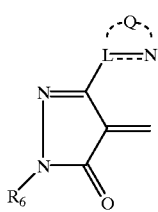

Formula (8)

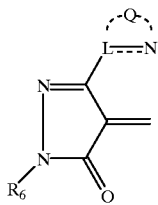

Formula (9)

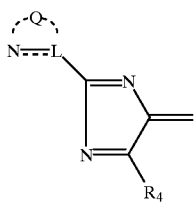

Formula (10)

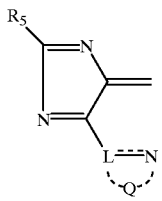

Formula (11)

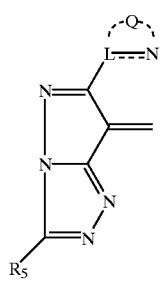

In the formulas L represents a carbon atom or a nitrogen atom; Q represents a group of atoms which forms a nitrogen-containing heterocyclic ring together with L; $R_4$, $R_5$, and $R_6$ independently represent a hydrogen atom or a monovalent substituent.

The nitrogen-containing heterocyclic ring capable of being formed together with L includes a pyrrole ring, a pyrrolidine ring, a pyrazole ring, an imidazole ring, an oxazole ring, a thiazole ring, a triazole ring, a thiadiazole ring, a pyridine ring, a quinoline ring, a pyridazine ring, a pyrimidine ring, a pyradine ring, a triazine ring, an indole ring, a benzthiazole ring and a benzimidazole ring.

A monovalent substituent represented by $R_1$ in Formula (3) and $R_4$ through $R_6$ in Formulas (4) through (11) includes a hydrogen atom, a halogen atom (a chlorine atom and a bromine atom), or a mono-valent substituent. As a monovalent substituent, an alkyl group (for example, a methyl group, an ethyl group, an isopropyl group, a hydroxyethyl group, a methoxymethyl group, a trifluoromethyl group and a t-butyl group), a cycloalkyl group (for example, a cyclopentyl group and a cyclohexyl group), an aralkyl group (for example, a benzyl group and a 2-phenetyl group), an aryl group (for example, a phenyl group, a naphtyl group, a p-tolyl group and a p-chlorophenyl group), an alkoxy group (for example, a methoxy group, an ethoxy group, an isopropoxy group and an n-buthoxy group), an aryloxy group (for example, a phenoxy group), an acylamino group (for example, an acetylamino group and a propionylamino group), an alkylthio group (for example, a methylthio group, an ethylthio group and an n-butylthio group), an arylthio group (for example, a phenylthio group), a sulfonylamino group (for example, a methanesulfonylamino group and a benzenesulfonylamino group), an ureido group (for example, a 3-methylureido group, a 3,3-dimethylureido group and a 1,3-dimethylureido group), a sulfamoylamino group (a dimethylsulfamoylamino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group (for example, a phenoxycarbonyl group), a sulfonyl group (for example, a methanesulfonyl group, a buthanesulfonyl group and a phenylsulfonyl group), an acyl group (for example, an acetyl group, a propanoyl group and a buthyloyl group), an amino group (a methylamino group, an ethylamino group and a dimethylamino group), a cyano group, a hydroxy group, a nitro group, a nitroso group, an amineoxide group (for example, a pyridine-oxide group), an imide group (for example, a phthalimide group), and a heterocyclic group (for example, a pyrizyl group, a benzimidazolyl group, a benzthiazolyl group and a benzoxazolyl group) are cited.

$Y_1$ and $Y_2$ each represents an aromatic hydrocarbon ring or a group of atoms forming a heterocyclic ring. Preferably, $Y_1$ and $Y_2$ each represents a 6-member aromatic carbon ring or a 5-member or 6-member heterocyclic ring, each of which ring may additionally have a substituent thereon.

Preferable examples of the carbon ring are an aromatic hydrocarbon ring and examples includes a benzene ring and a naphthalene ring. As for example of hetero ring includes a pyrrole, oxazole, oxazoline, imidazole, thiazole, thiazoline, thiophene, furan, pyrrolidine, indole, indolenine, pyridine, 4H-pyridine, pyrazole, triazole, thiadiazole, pyrydazine, pyrimidine and pyrazine are cited. The above-mentioned rings may further form a condensed ring with another carbon ring (for example, a benzene ring) or a heterocyclic ring (for example, a pyridine ring).

As a substituent on a ring, a monovalent substituent represented by $R_1$ in Formula (3) and $R_4$ through $R_6$ in Formulas (4) through (11) explained above is cited.

$L_1, L_2, L_3, L_4,$ and $L_5$ each represents a non-substituted or substituted methine group, as for whose substituent a halogen atom (a chlorine atom and a bromine atom), an alkyl group (for example, a methyl group, an ethyl group, an isopropyl group, a hydroxyethyl group, a methoxymethyl group, a trifluoromethyl group and a t-butyl group), a cycloalkyl group (for example, a cyclopentyl group and a cyclohexyl group), an aryl group (for example, a phenyl group, a naphtyl group, a p-tolyl group and a p-chlorophenyl group), an alkoxy group (for example, a methoxy group, an ethoxy group, an isopropoxy group and an n-buthoxy group), an aryloxy group (for example, a phenoxy group), an alkylthio group (for example, a methylthio group, an ethylthio group and an n-butylthio group), an arylthio group (for example, a phenylthio group), an alkoxycarbonyl group (for example, a methoxycarbonyl group and an ethoxycarbonyl group), an aryloxycarbonyl group (for example, a phenoxycarbonyl group), an acyl group (for example, an acetyl group, a propanoyl group and a buthyloyl group), an amino group (a methylamino group, an ethylamino group and a dimethylamino group), a carbamoyl group (for example, a methylcarbamoyl group, an ethylcarbamoyl group and a dimethylcarbamoyl group), a cyano group and a heterocyclic group (for example, a pyrizyl group) are cited.

Practical examples of methine dyes represented by Formulas (1) and (2) are illustrated.

D-1
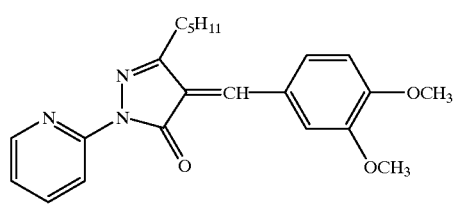

D-2
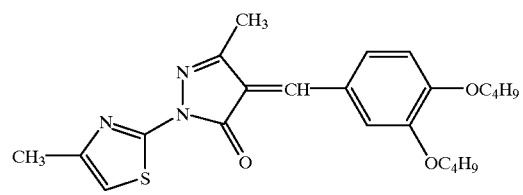

-continued
D-3
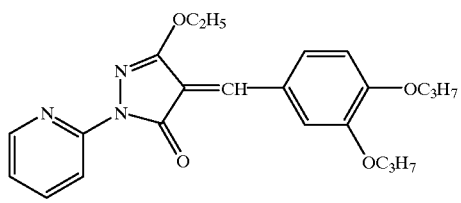
D-4
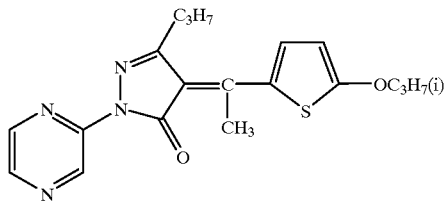
D-5
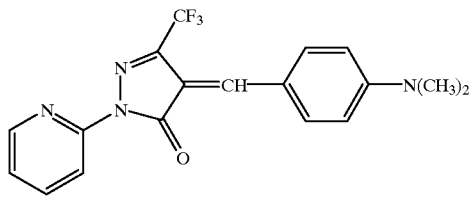
D-6
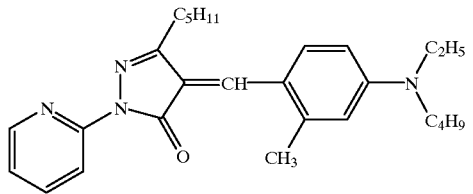
D-7
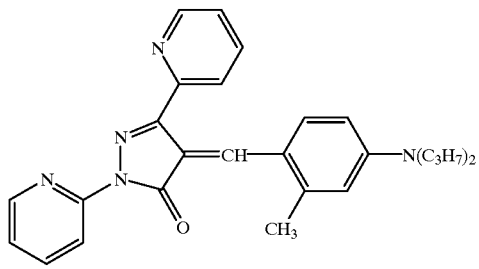
D-8
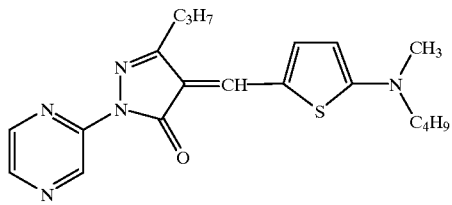
D-9
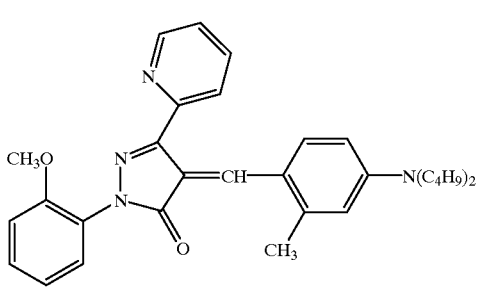

-continued
D-10
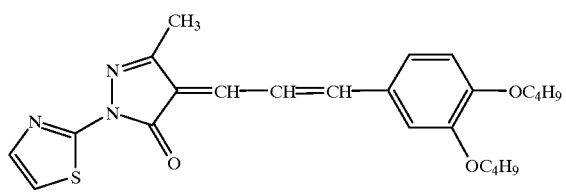
D-11
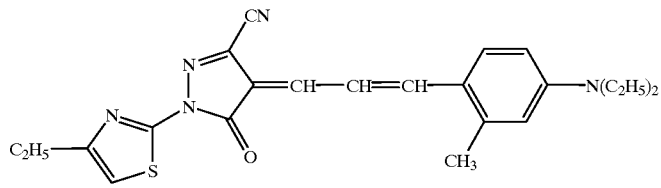
D-12
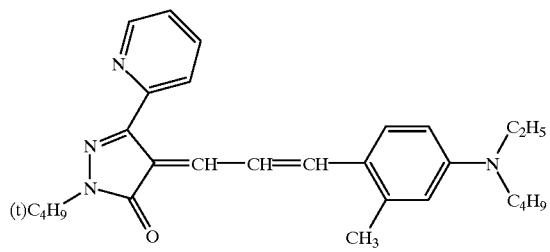
D-13
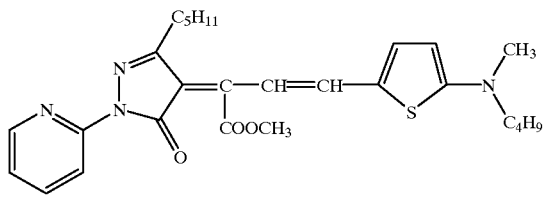
D-14
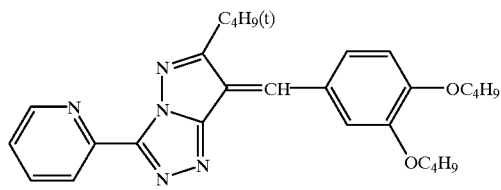
D-15
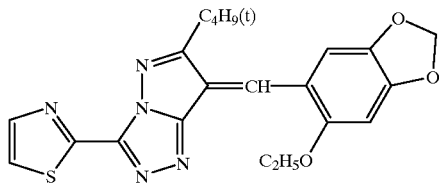
D-16
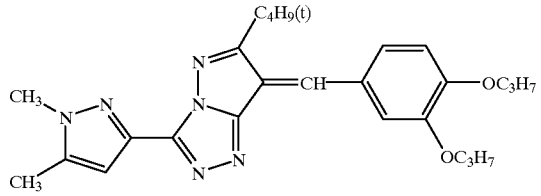

-continued
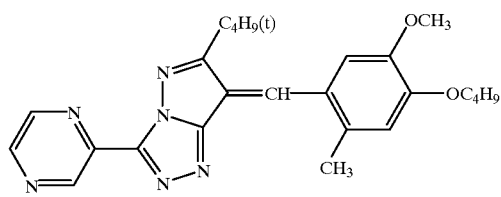
D-17
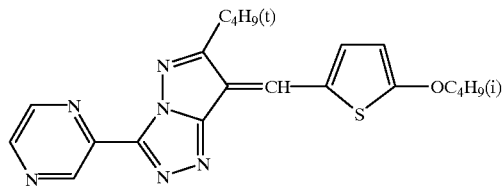
D-18
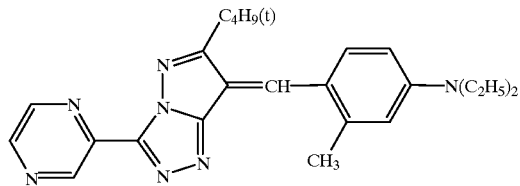
D-19
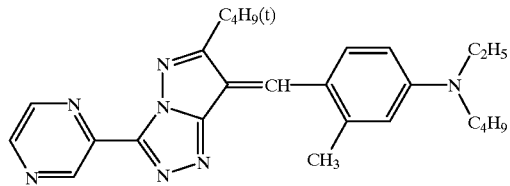
D-20
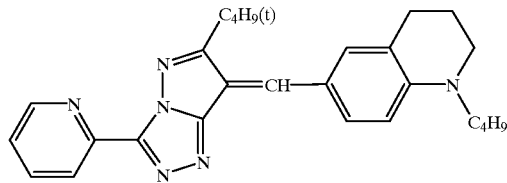
D-21
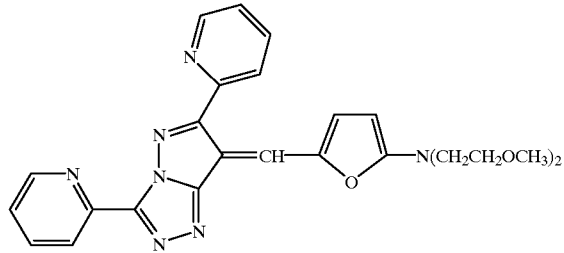
D-22
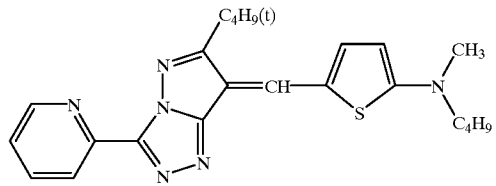
D-23
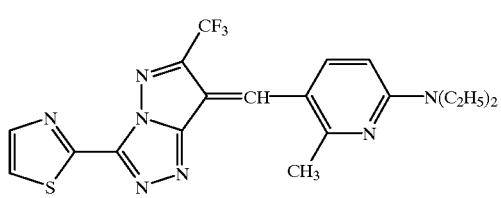
D-24

-continued
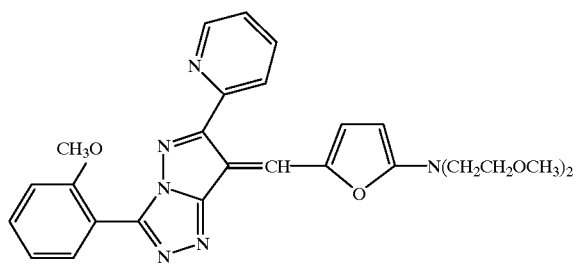
D-25
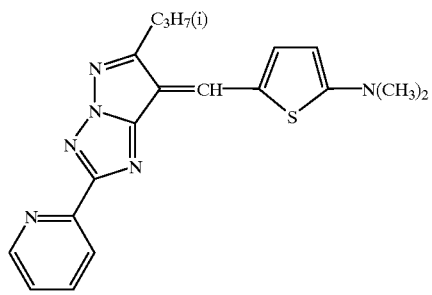
D-26
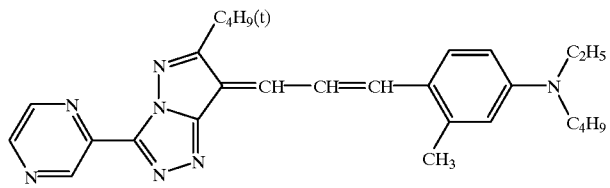
D-27
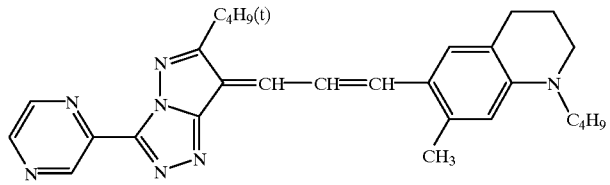
D-28
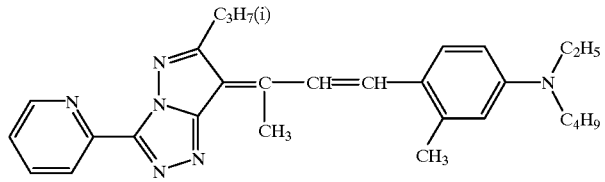
D-29
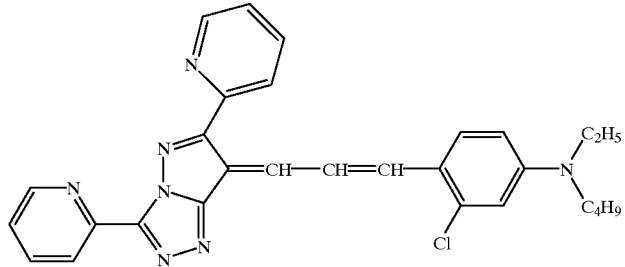
D-30
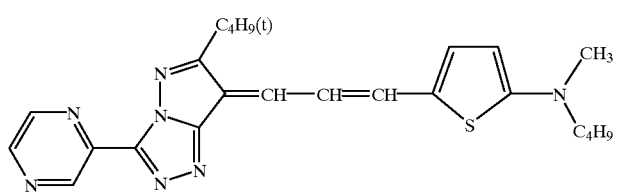
D-31

D-32
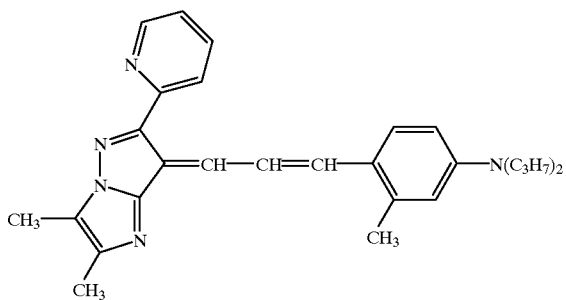
D-33
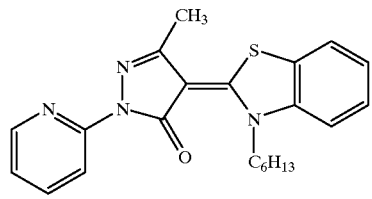
D-34
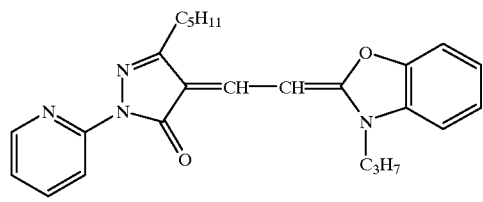
D-35
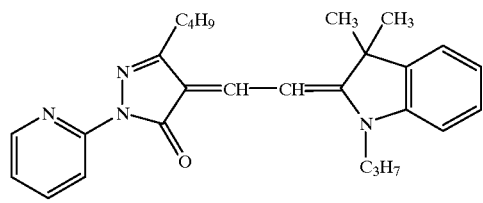
D-36
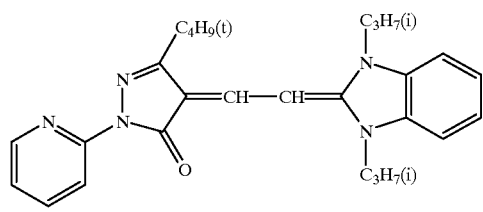
D-37
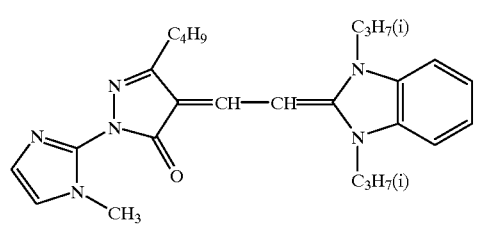
D-38
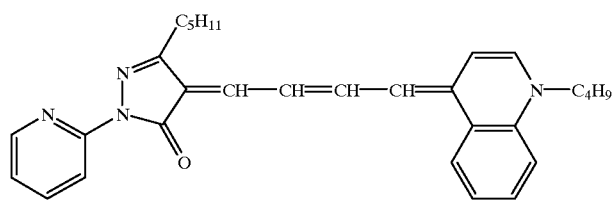

-continued
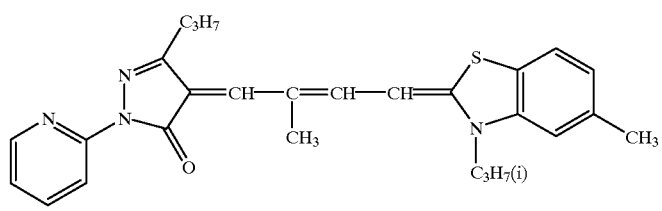
D-39
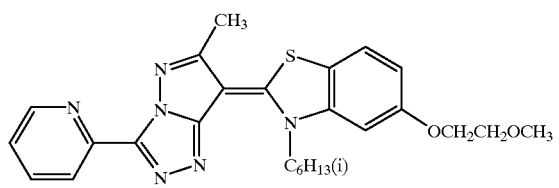
D-40
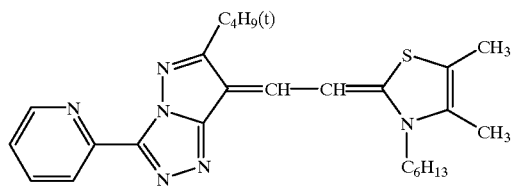
D-41
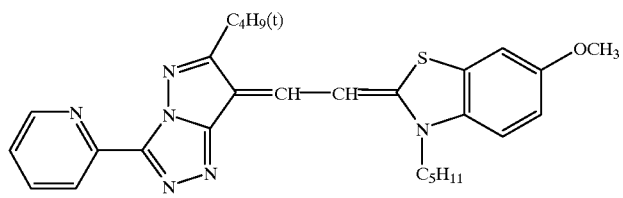
D-42
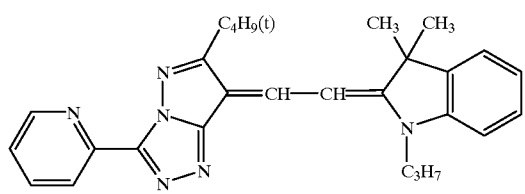
D-43
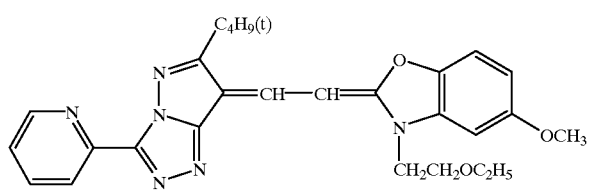
D-44
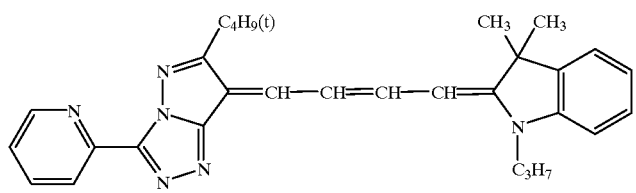
D-45
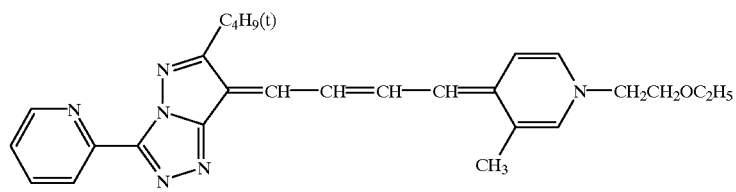
D-46

-continued
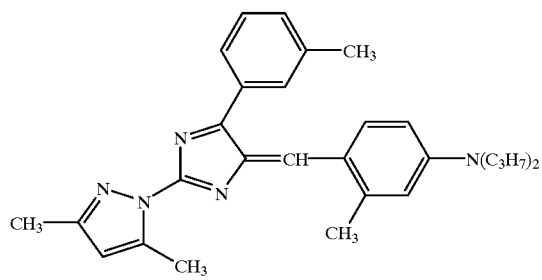
D-47
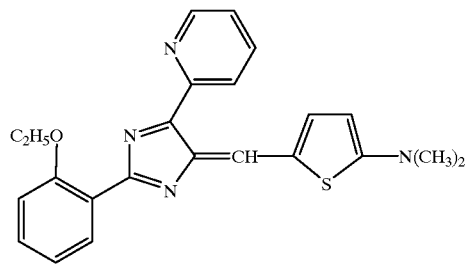
D-48
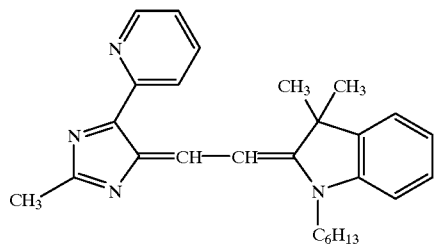
D-49
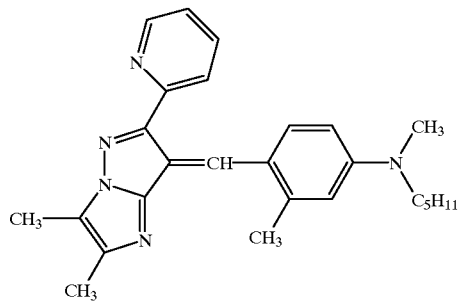
D-50
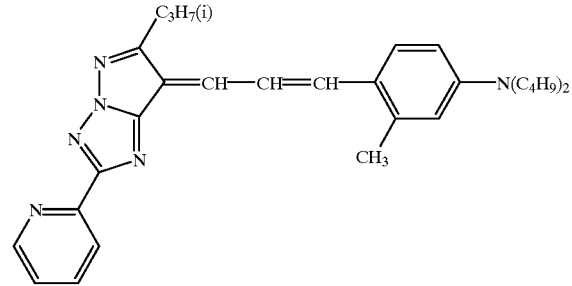
D-51
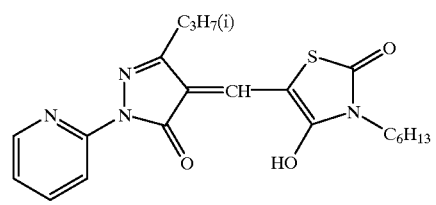
D-52

-continued

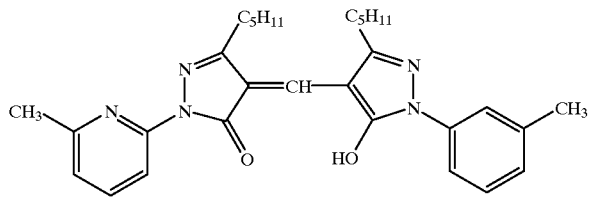

D-53

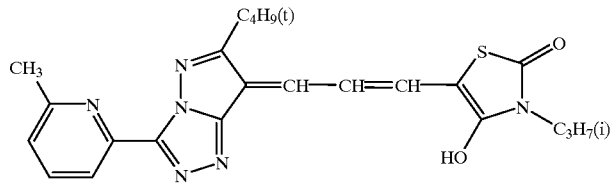

D-54

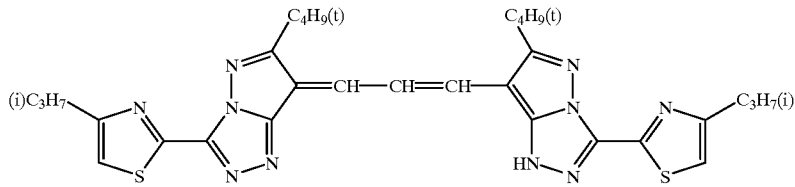

D-55

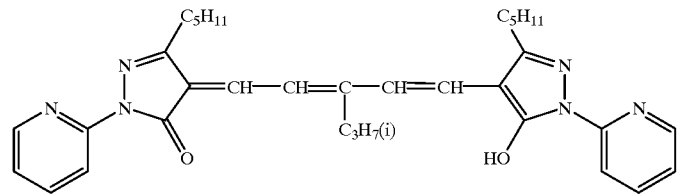

D-56

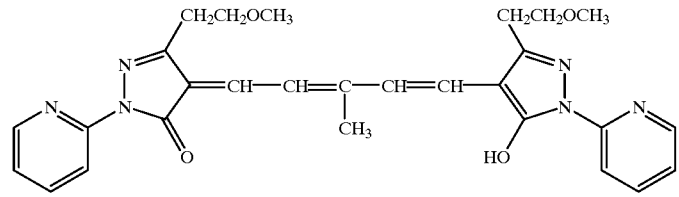

D-57

These compounds are readily synthesized according to known methods.

SYNTHESIS EXAMPLE 1

D-34

In 50 ml of ethanol 2-(2-acetanilide vinyl)-3-propylbenzooxazolium iodide in an amount of 5.0 g, 3-pentyl-1-(2-pyridyl)-5-pyrazolone in an amount of 2.8 g and triethyl amine in an amount of 2.0 ml were added and the mixture was refluxed with heating for 30 minutes. The resultant was cooled to room temperature, and then 50 ml of water was added to deposit crystals which was filtrated. The crystal was recrystallized in acetonitril to obtain 3.0 g of yellowish orange crystal. The compound was identified by means of NMR spectrum analysis and mass spectrum analysis. Absorption maximum in acetonitrile was 455 nm.

SYNTHESIS EXAMPLE 2

D-20

Into 120 ml of toluene, 8.5 g of 6-t-butyl-3-(2-pyrazinyl)pyrazolo[3,2-c][1,2,4]triazol, 8.5 g of 4-(N-butyl-N-ethylamino)-2-methylbenzaldehyde and piperidine were added and the mixture was refluxed with heating for 5 hours. The resultant was cooled to room temperature, and washed with deionized water and saturated salt water, and the solvent was moved by distillation after drying with sodium sulfite unhydride. The resulted red crystal was recrystallised in 200 ml methanol to obtain 7.8 g of targeted compound. The compound was identified by means of NMR spectrum analysis and mass spectrum analysis. Absorption maximum in acetonitrile was 522 nm.

SYNTHESIS EXAMPLE 3

D-27

Into 80 ml of acetic acid, 8.5 g of 6-t-butyl-3-(2-pyrazinyl)pyrazolo[3,2-c][1,2,4]triazol, 9.5 g of 4-(N-butyl-N-ethylamino)-2-methylcinnamic aldehyde and 3.5 g of potassium acetate were added and the mixture was refluxed with heating for 3 hours. The resultant was cooled to room temperature, and ethyl acetate was added, then washed with deionized water and saturated salt water, and the solvent was moved by distillation after drying with sodium sulfite unhydride. The resultant was refined by means of column chromatography to obtain 5.8 g of crystal. The compound was identified by means of NMR spectrum analysis and mass spectrum analysis. Absorption maximum in acetonitrile was 563 nm.

The thermal transfer recording material of the present invention comprises a support provided thereon with an ink layer containing at least one of a methine dye. The dye represented by Formulas (1) or (2) is easy to dissolve and therefore may be incorporated in the ink layer with high content. It gives high transfer sensitivity and preferable black image.

The dye composition of the invention contains at least the methine dye having a radical or a group of atoms capable of forming chelate bond in at least two positions. In addition another dye may be optionally used in combination. The example of the dye includes an azo dye disclosed in, for example, Japanese Patent O.P.I Publication Nos. 4-158092, 5-301470 and 5-177958, an azomethine dye disclosed in, for example, Japanese Patent O.P.I Publication Nos. 4-89287 and 1-63194, an azo dye disclosed in, for example, Japanese Patent O.P.I Publication Nos. 60-27594, 61-12394, a quinophthalon dye disclosed in, for example, Japanese Patent O.P.I Publication Nos. 60-53565 and 63-189289, an anthraquinone dye disclosed in, for example, Japanese Patent O.P.I Publication Nos. 60-253595, 60-131294 and 63-144089, and an indoaniline dye disclosed in, for example, Japanese Patent O.P.I Publication Nos. 60-239286 and 61-57651.

The yellow, magenta and cyan dyes used for the innovation include any yellow, magenta and cyan dyes to obtain black dye being used in combination in addition to those designed for the so-called full color image purpose. Content of each dye is preferably 10 to 50 weight percent to the whole weight of dyes in the ink layer.

Content of the dye in the ink layer is preferably 0.05 to 10 g per 1 m². The ink layer can be formed by coating an ink composition which was prepared by dissolving the mixture of the dye together with a binder in a solvent or by dispersing the dye of the present invention in a solvent in a fine particle state on a support and also by appropriately drying.

The ink may contain, if necessary, an organic or inorganic non-sublimation fine particle, a dispersant, an anti-static agent, a deforming agent, an anti-oxidant and a thickening agent. The thickness of the thermal transfer layer is preferably 0.1–10 μm.

As the above-mentioned binder, solvent-soluble polymers such as an acrylic resin, a methacrylic resin, polystyrene, polycarbonate, polysulfon, polyethersulfon, polyvinyl butyral, polyvinyl acetal, nitrocellulose and ethylcellulose are preferable. These binders may be used by dissolving one or two or more thereof in an organic solvent. In addition, they may be used in the form of a latex dispersion. Used amount of binder is preferably 0.1–20 g per 1 m² of a support.

As the above-mentioned organic solvent, alcohols (for example, ethanol and propanol), cellosolves (for example, methylcellosolve), aromatics (for example, toluene and xylene), esters (for example, ethylacetate, butylacetate), ketones (for example, acetone and methylethylketone) and ethers (for example, tetrahydrofuran and dioxane) are cited.

As the support of the thermal transfer recording material, anything having dimension stability and heat fastness on a thermal head used when recording can be used. Thin paper such as condenser paper and a glassine paper and heat durable plastic film such as polyethylene terephthalate, polyamide and polycarbonate are preferably used. The thickness of the support is preferably 2–30 μm. In addition, it is preferable that the support has a subbing layer composed of a polymer which is selected for the purpose of improvement of adhesiveness with the binder, transfer of a dye onto a support and preventing dyeing. In addition, a slipping layer may be provided for the purpose of preventing adhesion of the head onto the support.

In the thermal transfer recording method using the dye providing material, after superposing an ink layer of the dye providing material and an image-receiving material, heat in accordance with image information is provided to the thermal transfer recording material so that an image by means of the metal chelate dye of is caused to form on the image-receiving material. According to this method an image having high density and image stability can be obtained with good performance.

A compound containing a metal ion may be incorporated in the image receiving layer or a thermo-melting layer provided on the ink layer.

As a metal, monovalent and multi-valent metals belonging to the I through VIII group in the periodic table are cited. Of these, Al, Co, Cr, Cu, Fe, Mg, Mn, Mo, Ni, Sn, Ti and Zn are preferable. Specifically, Ni, Cu, Cr, Co and Zn are preferable.

As practical examples of metal ion containing compounds, salt of fatty acid such as acetic acid or stearic acid, or salts of aromatic carbonic acid such as benzoic acid or salicylic acid with $Ni^{2+}$, $Cu^{2+}$, $Cr^{2+}$, $Co^{2+}$ and $Zn^{2+}$ are cited.

In addition, complexes represented by the following Formula (Mx) can preferably be used.

$$[M(Q_1)a(Q_2)b(Q_3)c]^{P+}(Y^-)_P \quad \text{Formula (Mx)}$$

wherein M represents a metal ion, preferably $Ni^{2+}$, $Cu^{2+}$, $Cr^{2+}$, $Co^{2+}$ and $Zn^{2+}$; $Q_1$, $Q_2$ and $Q_3$, which may be the same or different, respectively represent a coordination compound capable of coordinate-bonding with a metal ion represented by M; these coordinate compounds may be selected from coordination compounds described in "Chelate Science" (5) (Nankohdo); $Y^-$ represents an organic anion group, and practically tetraphenyl boron anion and alkyl benzene sulfonic acid anion can be cited; a, b and c represents an integer of 0, 1, 2 or 3, provided that they may be determined according to that a complex represented by the Formula (Mx) is tetradentate or octadentate or the number of ligands of $Q_1$, $Q_2$ and $Q_3$; P is 1 or 2.

Among the complexes represented by Formula (Mx) preferable example is a compound represented by the following Formula (Mx-1), that is a=b=c=0 in Formula (Mx).

Formula (Mx-1)

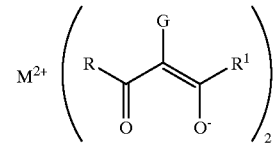

In the formula, $M^{2+}$ represents a divalent transition metal atom, G represents an alkyl group, an aryl group, an alkoxy group, an alkoxycarbonyl group, a halogen atom and a hydrogen atom; R and $R_1$, which may be the same or different, independently represent an alkyl group or an aryl group; R and $R_1$, may respectively form a ring by bonding with G.

The amount of metal ion-containing compounds are preferably 0.5–20 g/m² and more preferably 1–15 g/m² in an image-receiving material or a thermo-melting layer.

The above-mentioned image-receiving material comprises a support made of paper, plastic film or paper-plastic film complex material provided thereon with, as an image-receiving layer, a polyester resin, a polyvinyl chloride resin, a copolymer of vinyl chloride and other monomers (for example, vinyl acetic acid) or one kind of or two or more kinds of polymer layers such as polyvinyl butyral, polyvinyl pyrrolidone and polycarbonate.

The image-receiving material may contain an anti-oxidation agent, a releasing agent etc. in the image-receiving layer if necessary. A protective layer may be provided on an image-receiving layer, in order to prevent fusing. Further, between the support and the image-receiving layer, an intermediate layer may be provided for the purposes of adhesion, heat insulation or cushioning effect. On the back side of the support opposite to the image receiving layer a backing layer containing an inorganic or organic non-sublimation fine particles may be provided for the purpose of the anti-statics, blocking preventing and so on. Optionally the image receiving layers may be provided on both side of the support.

The thermal transfer recording material of the present invention may have a thermo-melting layer containing a thermo-melting compound described in Japanese Patent O.P.I. Publication No. 59-106997 on a thermal transfer layer or another layer on a support wherein the thermal transfer layer is not coated, for the purpose of employing a material such as plain paper wherein no image-receiving layer is specifically provided for the image-receiving material described later. As the thermo-melting compound, a colorless or a white compound which melts at 65–150° C. including waxes such as carnauba wax, bees wax and candeline wax are cited. In the above-mentioned thermo-melting layer, for example, polymers such as polyvinyl pyrrolidone, polyvinyl butyral, polyester and vinyl acetic acid may be incorporated.

Heating is usually conducted by means of thermal head, and electrical heating or laser may be applied.

EXAMPLE

Example 1

Preparation of an Ink

The following materials were mixed so that a uniform ink composition containing dyes was obtained. The solubility of the dye and its suitability as an ink were favorable.

| | |
|---|---|
| Yellow dye (D-17) | (amount is shown in Table 1) |
| Magenta dye (D-23) | (amount is shown in Table 1) |
| Cyan dye (D-28) | (amount is shown in Table 1) |
| Polyvinyl acetal resin (KY-24, produced by Denki Kagaku Chemical Ind. Co., Ltd.) | 2.5 g |
| Methylethylketone | 55 g |
| Toluene | 22 g |
| Silicon modified urethane resin (SP-2105, product of Dainichi Kasei) | 1.8 g |

Preparation of the Dye Providing Material

The above-mentioned ink was coated on a 6 μm polyethylene terephthalate base with a wire bar in such a manner that the coated amount after being dried would be 2.0 g/m², and was then dried. Thus, a thermal transfer recording material-1 comprising a thermal transfer layer on a polyethylene terephthalate film was formed. The sample was dried by means of a dryer tentatively and dried in an oven for 15 minutes at 70° C.

On a rear surface of the above-mentioned polyethylene terephthalate base, a nitro cellulose layer containing a silicone-degenerated urethane resin (SP-2105, produced by Dainichi-Seika Co. Ltd.) is applied as an anti-sticking layer.

Preparation of the Image-Receiving Material

On a synthesized paper (Yupo FPG-150, product of Oji Yuka) a coating composition having the following component was coated and subsequently dried so that image receiving element 1 was formed. Drying was conducted by means of a dryer tentatively and dried in an oven for 15 minutes at 100° C.

In addition, image receiving element 2 having the same composition as image receiving element 1 except that the metal ion containing compound was removed from image-receiving material 1 was formed.

| | |
|---|---|
| Metal ion containing compound (shown as follows) | 2.0 g |
| Polyvinyl butyral resin (BX-1, produced by Sekisui Chemical Ind. Co. Ltd.) | 6.0 g |
| Polyester-modified silicone (X-24-8300, Product of Shinnetsu Chemical Ind. Co. Ltd.) | 0.3 g |

Metal Ion Containing Compound

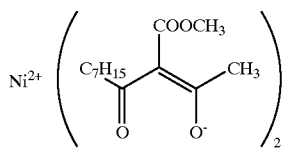

Thermal Transfer Recording Method

The dye providing material 1 and the image receiving element 1 were superposed and a thermal head was applied from the rear surface of the dye providing material for conducting image recording under the condition shown below so that neutral gray image having excellent gradation were obtained.

Recording Condition

Record density: 8 dot/mm for main and sub scanning direction

Recording Power: 0.6 W/Dot

Heating Time: 20 m sec or longer (adjusted 20 m sec plus every 0.2 m sec stepwisely)

In the similar manner to the dye providing material 1, dye providing materials 2 to 10 employing the methine dye as shown in Table 1 in place of the dye were manufactured. Images 2 to 10 were obtained by using the dye providing materials 2 to 10 and the image receiving material 1 in the same Recording condition.

TABLE 1

| Dye providing material No. | Yellow dye No. | Amount | Magenta dye No. | Amount | Cyan dye No. | Amount |
|---|---|---|---|---|---|---|
| 1 | D-17 | 0.47 g | D-23 | 0.25 g | D-28 | 0.28 g |
| 2 | D-34 | 0.45 g | D-19 | 0.25 g | D-27 | 0.28 g |
| 3 | D-34 | 0.45 g | D-23 | 0.25 g | D-28 | 0.28 g |
| 4 | D-14 | 0.47 g | D-20 | 0.25 g | D-13 | 0.30 g |
| 5 | H-1 | 0.52 g | H-2 | 0.35 g | D-27 | 0.28 g |
| 6 | D-34 | 0.45 g | H-2 | 0.35 g | H-3 | 0.37 g |
| 7 | H-1 | 0.52 g | D-20 | 0.25 g | H-3 | 0.37 g |
| 8 | H-1 | 0.45 g | D-20 | 0.25 g | D-27 | 0.28 g |
| 9 | D-34 | 0.45 g | H-2 | 0.35 g | D-27 | 0.28 g |
| 10 | D-34 | 0.45 g | D-20 | 0.25 g | H-3 | 0.37 g |

H-1

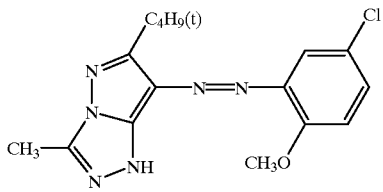

H-2

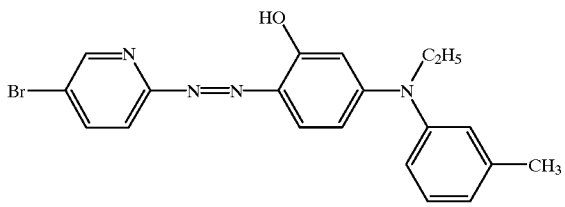

H-3

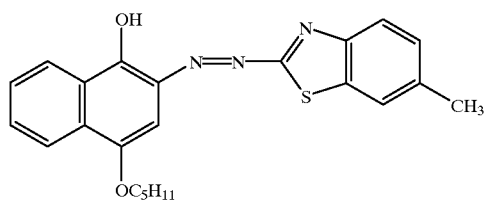

Preparation of Dye Providing Material 11

The following materials were mixed so that a uniform ink composition containing a dye was obtained.

| | |
|---|---|
| Yellow dye (H-1) | 0.65 g |
| Magenta dye (H-2) | 0.45 g |
| Cyan dye (H-3) | 0.48 g |
| Polyvinyl acetal resin (KY-24, produced by Denki Kagaku Chemical Ind. Co., Ltd.) | 2.3 g |
| Methylethylketone | 53 g |
| Toluene | 22 g |
| Silicon modified urethane resin (SP-2105, product of Dainichi Kasei) | 1.8 g |

In the similar manner to the dye providing material-1, dye providing material-11 was manufactured by replacing dyes with the three dyes shown above. Image 11 was obtained by using the dye providing material 11 and the image receiving material-1 in the same Recording condition.

After recording, maximum image density (Dmax) and image storage stability were evaluated in accordance with the following conditions. Table 2 shows the results thereof.

Evaluation of maximum density: The maximum reflection density (ordinarily, a portion where the imprinting time was max.) was measured by means of an X-rite 310 TR.

Evaluation on image storage stability: The resulting image was subjected to light irradiation for 5 days with a Xenon Fadometer for evaluating light fastness. The dye residual ratio (image storage stability) was represented by $D/D_0 \times 100$, provided that the density before the image was irradiated was $D_0$ and the density after the image was irradiated was D. Table 2 shows the results of dye residual ratio (image storage stability) after the image was irradiated.

TABLE 2

| Image No. | Dye used | | | Dmax | Dye residual ratio |
|---|---|---|---|---|---|
| 1 | D-17 | D-23 | D-28 | 2.12 | 89% |
| 2 | D-34 | D-19 | D-27 | 2.30 | 90% |
| 3 | D-34 | D-23 | D-28 | 2.25 | 88% |
| 4 | D-14 | D-20 | D-13 | 2.18 | 88% |
| 5 | H-1 | H-2 | D-27 | 1.88 | 83% |
| 6 | D-34 | H-2 | H-3 | 1.76 | 78% |
| 7 | H-1 | D-20 | H-3 | 1.86 | 82% |
| 8 | H-1 | D-20 | D-27 | 2.03 | 86% |
| 9 | D-34 | H-2 | D-27 | 1.98 | 85% |
| 10 | D-34 | D-20 | H-3 | 1.95 | 89% |
| 11 | H-1 | H-2 | H-3 | 1.52 | 78% |

As shown in Table 2, the dye providing material employing the dyes of the present invention has high sensitivity, and favorable image storage stability. An image with high density is obtained by using dyes in combination.

Example 2

Preparation of an Ink

The following materials were mixed so that a uniform ink composition containing dyes was obtained. The solubility of the dye and its suitability as an ink were favorable.

| | |
|---|---|
| Yellow dye (D-17) | (amount is shown in Table 3) |
| Magenta dye (D-23) | (amount is shown in Table 3) |
| Cyan dye (D-27) | (amount is shown in Table 3) |
| Polyvinyl acetal resin (KY-24, produced by Denki Kagaku Chemical Ind. Co., Ltd.) | 2.5 g |
| Methylethylketone | 55 g |
| Toluene | 22 g |
| Silicon modified urethane resin (SP-2105, product of Dainichi Kasei) | 1.8 g |

Preparation of the Dye Providing Material

The above-mentioned ink was coated on a 4.5 μm polyethylene terephthalate base with a wire bar in such a manner that the coated amount after being dried would be 2.8 g/m², and was then dried. Thus, a thermal transfer recording material 12 comprising a thermal transfer layer on a polyethylene terephthalate film was formed.

On a rear surface of the above-mentioned polyethylene terephthalate base, a nitro cellulose layer containing a silicone-degenerated urethane resin (SP-2105, produced by Dainichi-Seika Co. Ltd.) is applied as an anti-sticking layer.

Dye providing materials 13 to 18 were prepared in the same way as in Example 1 using dyes shown in Table 3.

Image receiving element 2 was prepared by coating the same composition as image receiving element 1 on a colored transparent support (polyethylene terephthalate film of 175

μm thickness having blue color with density of 0.170 by anthraquinone dye) and dried so that the amount after drying is 7.2 g/m².

TABLE 3

| Dye providing material No. | Yellow dye | | Magenta dye | | Cyan dye | |
|---|---|---|---|---|---|---|
| | No. | Amount | No. | Amount | No. | Amount |
| 12 | D-17 | 0.50 g | D-23 | 0.33 g | D-27 | 0.38 g |
| 13 | D-7 | 0.50 g | D-21 | 0.35 g | D-27 | 0.38 g |
| 14 | D-35 | 0.50 g | D-19 | 0.35 g | D-51 | 0.38 g |
| 15 | D-34 | 0.48 g | D-8 | 0.35 g | D-28 | 0.38 g |
| 16 | D-34 | 0.48 g | D-25 | 0.35 g | D-13 | 0.38 g |
| 17 | D-14 | 0.50 g | D-23 | 0.33 g | D-13 | 0.38 g |
| 18 | H-4 | 0.65 g | H-5 | 0.45 g | H-6 | 0.52 g |

H-4

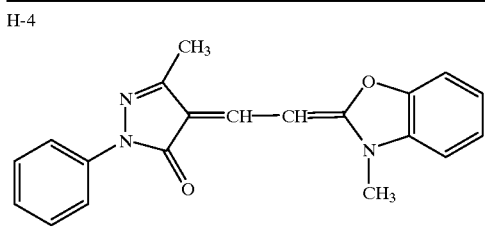

H-5

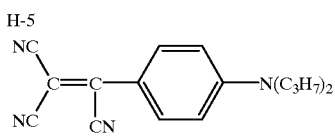

H-6

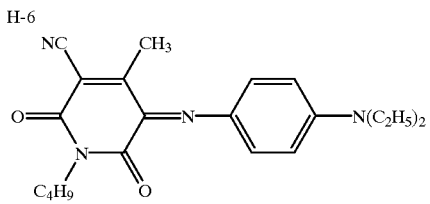

Thermal Transfer Recording Method

In the same way as Example 1 the dye providing materials 12 to 18 and the image receiving element 2 were superposed and a thermal head was applied from the rear surface of the dye providing material for conducting image recording under the condition shown below so that images 12 to 18 having excellent gradation were obtained.

After recording, maximum image density (Dmax) and image storage stability were evaluated in the same condition as in Example 1. Table 4 shows the results thereof.

TABLE 4

| Image No. | Dye used | | | Dmax | Dye residual ratio |
|---|---|---|---|---|---|
| 12 | D-17 | D-23 | D-27 | 2.52 | 90% |
| 13 | D-7 | D-21 | D-27 | 2.45 | 88% |
| 14 | D-35 | D-19 | D-51 | 2.50 | 89% |
| 15 | D-34 | D-8 | D-28 | 2.48 | 87% |
| 16 | D-34 | D-25 | D-13 | 2.50 | 88% |
| 17 | D-14 | D-23 | D-13 | 2.47 | 85% |
| 18 | H-4 | H-5 | H-6 | 1.78 | 35% |

As shown in Table 4, the dye providing material employing the dyes of the present invention has high sensitivity, and favorable image storage stability.

An ink layer of each of the dye providing material after stored for 10 hours at 50° C. was rubbed with the image receiving material, and the diffusion of dye were evaluated. As the result, while in comparative dye providing material 18 dye diffused to be found contamination, no contamination was found for the dye providing materials 12 to 18 and showed the good storability of the dye providing material.

We claim:

1. Composition of mixture of dyes for forming black image comprising a yellow dye, a magenta dye and a cyan dye, wherein at least one of the dyes is a methine dye represented by formula (1) or (2),

wherein $X_1$ and $X_2$ each represent a group represented by Formula (4), (5), (6) or (7),

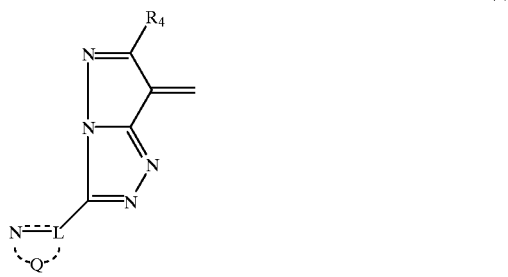

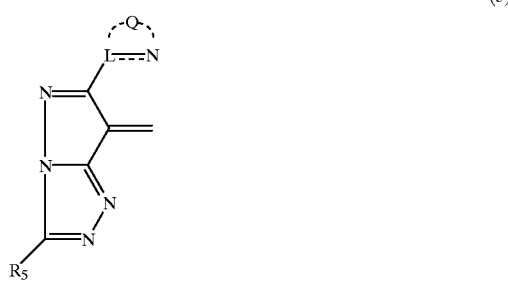

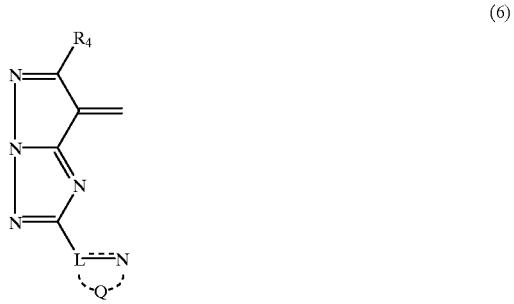

-continued

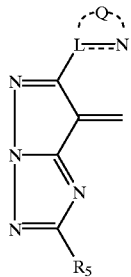

(7)

wherein L represents a carbon atom or a nitrogen atom; Q represents a group of atoms which forms a nitrogen-containing heterocyclic ring together with L; $R^4$, and $R^5$ independently represent a hydrogen atom or a monovalent substituent; $Y_1$ and $Y_2$ each represent a carbocyclic group or a heterocyclic group; $L_1$, $L_2$, $L_3$, $L_4$ and $L_5$ each represent a methine group which may be substituted; and $n_1$ and $n_2$ each represent 0, 1 or 2.

2. The composition of claim 1 wherein the composition comprises two methine dyes represented by formula (1) or (2).

3. The composition of claim 1 wherein the composition comprises three methine dyes represented by formula (1) or (2).

* * * * *